Sept. 1, 1953          C. E. SENNHOLTZ          2,650,470
CHAIN LINK
Filed Dec. 9, 1949                                  2 Sheets-Sheet 1
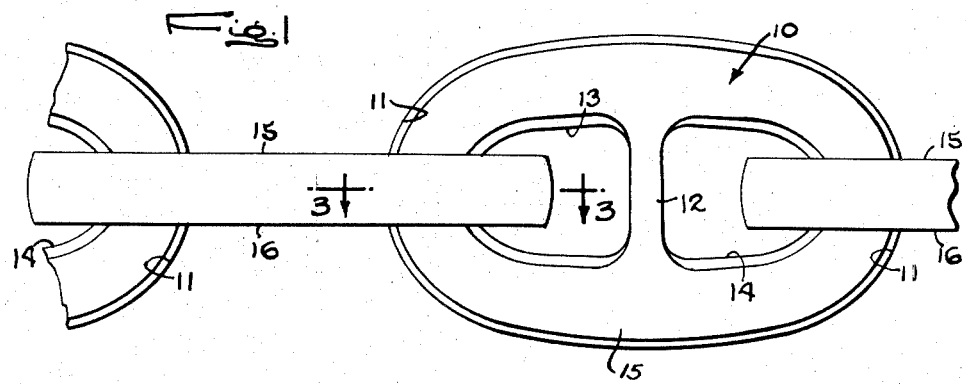
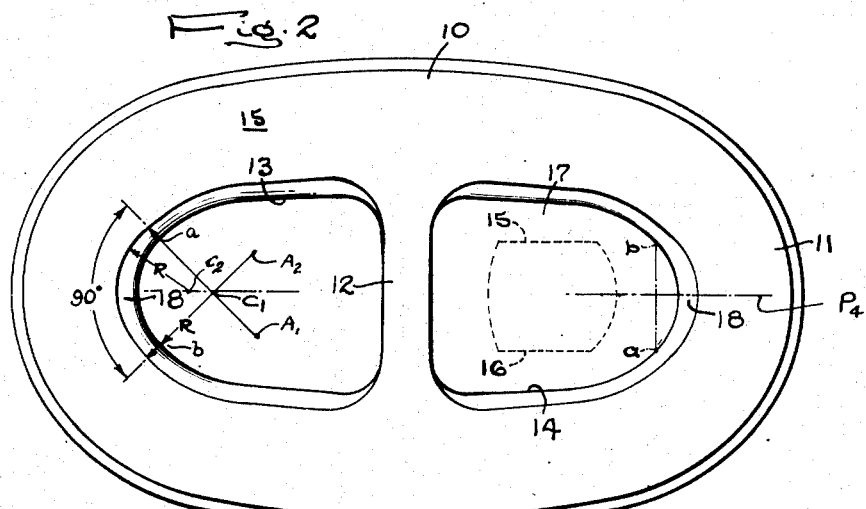
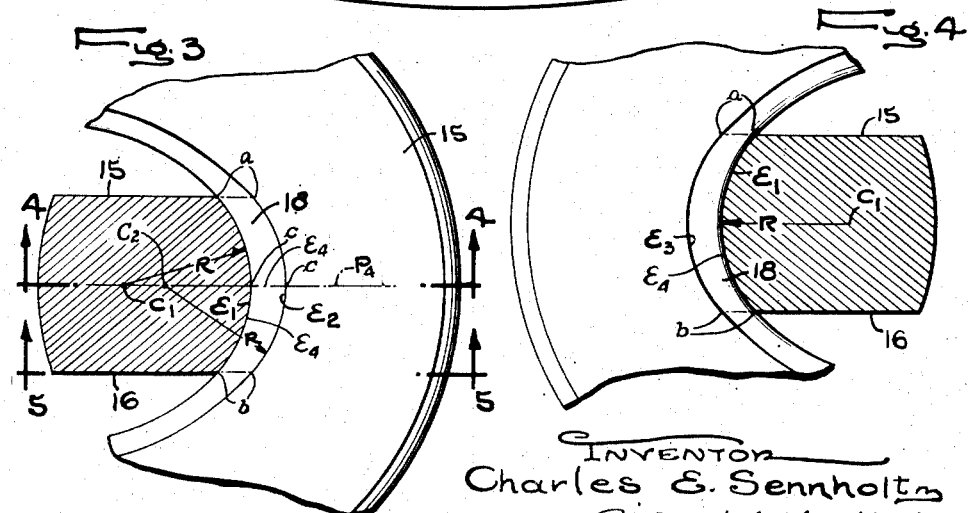
INVENTOR
Charles E. Sennholtz Sept. 1, 1953 C. E. SENNHOLTZ 2,650,470
CHAIN LINK
Filed Dec. 9, 1949 2 Sheets-Sheet 2
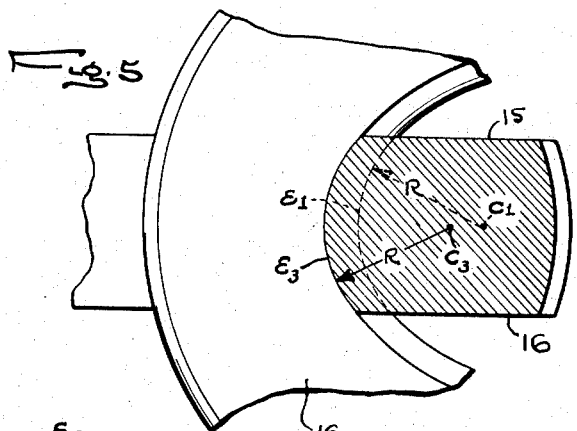
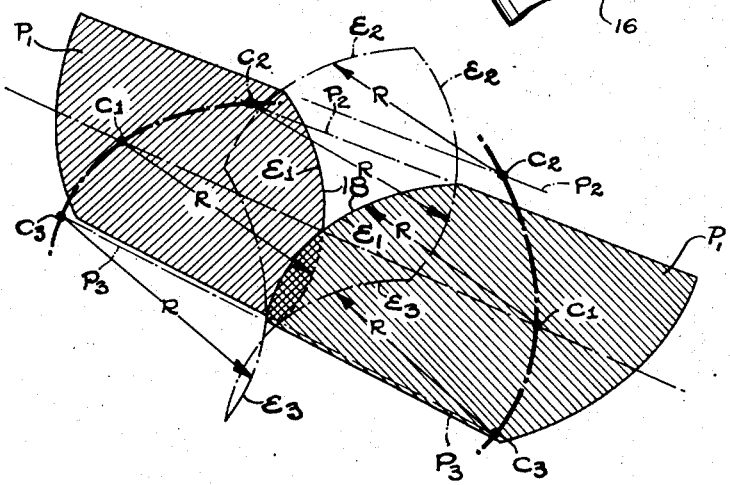
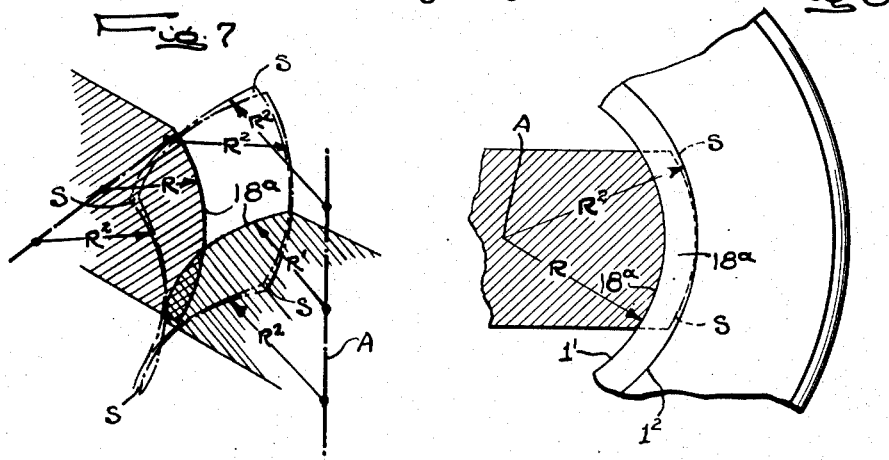
INVENTOR
Charles G. Sennholtz
By Carlson, Pitzner, Hubbard & Wolf
ATTORNEYS Patented Sept. 1, 1953

2,650,470

UNITED STATES PATENT OFFICE 2,650,470

CHAIN LINK

Charles E. Sennholtz, Chicago, Ill.

Application December 9, 1949, Serial No. 132,053

4 Claims. (Cl. 59—90)

The present invention relates generally to improvements in link chains adapted for heavy duty service, such, for example, as chains commonly employed for ship anchors and drag line excavator buckets, and has particular reference to a new and improved design of the interengaging chain links.

One of the objects of the present invention is to provide a novel chain link which for a given size is exceptionally strong and particularly resistant to wear and shock.

Another object is to provide a new and improved chain link having a sectional form providing a large area adapted for surface bearing engagement with the corresponding surface areas of adjacent links in any normal angular relationship.

A further object is to provide a novel chain link having openings at opposite ends which are shaped to guide the ends of the interconnected links expeditiously into surface bearing engagement upon the application of a longitudinal pull on the chain, thereby avoiding kinking and tangling.

Another and more specific object is to provide a new and improved chain link having opposite end openings for the reception of contiguous links which are so shaped that the arcuate ends afford full surface bearing contact when the chain is under tension, and which provide ample space or clearance for casting the links initially in the chain series.

Further objects and advantages will become apparent as the description proceeds.

In the accompanying drawings:

Figure 1 is a fragmentary view of a portion of the chain having interconnected links, each embodying the features of the present invention.

Fig. 2 is a face view, on an enlarged scale, of one of the chain links.

Fig. 3 is an enlarged fragmentary sectional view taken along line 3—3 of Fig. 1 and illustrating the surface bearing contact between two interconnected links in the longitudinal medial plane parallel to the faces of one of said links.

Fig. 4 is a view similar to Fig. 3, but taken along line 4—4 of Fig. 3 to illustrate the surface bearing contact between the links in the longitudinal medial plane parallel to the faces of the other of the links.

Fig. 5 is an enlarged fragmentary sectional view taken along line 5—5 of Fig. 3.

Fig. 6 is a diagrammatic view illustrating the locus of the centers of the curved inner surface elements in successive planes parallel to the side faces or general plane of the link.

Fig. 7 is a view similar to Fig. 6, but in which the radii of the elements of the curved surface in the successive planes are varied in length to locate the centers on a fixed axis perpendicular to the plane of the link.

Fig. 8 is a view similar to Fig. 5, but of a link construction according to Fig. 7.

Referring more particularly to the drawings, the chain link constituting the exemplary embodiment of the invention comprises a continuous oblong loop of integral construction having side bars 10 connected by curved ends 11. Preferably, the side bars 10 are additionally connected and reinforced by an intermediate transverse tie bar or strut 12 bisecting the open area circumscribed by the loop. When provided, the tie bar or strut 12 serves to define two openings 13 and 14 at opposite ends of the link for receiving the curved ends 11 of the adjoining links.

When a series of the links are interconnected to form a chain, as fragmentarily illustrated in Fig. 1, the curved ends of the adjoining links are disposed in direct bearing engagement upon the application of a longitudinal pull, and are adapted for relative angular movement, each about the other, respectively, in mutually perpendicular directions. For heavy duty chains, the links are usually cast as integral structures and with their curved ends in interconnected relationship. Hence, the links must have sectional forms and be so shaped and dimensioned that ample clearance is provided between the adjacent surfaces thereof to afford the necessary sand room in the casting operation.

The link (Fig. 3) is formed with flattened parallel side faces 15 and 16. As a result, the flat sides of the curved ends 11 of each link can be adequately spaced from the inner surfaces of the side bars 10 of the adjoining links to provide the necessary sand room 17. The length of the openings 13 and 14 is such that the actual cross-sectional area of the curved ends 11 can be made comparatively wide, as indicated in dotted outline in Fig. 2.

The curved ends 11 are formed with inner bearing surfaces 18 which are so generated in shape that, instead of being in point or line contact, as is the case in prior links, the interengaging ends 11 of each set of adjacent links when centered under tension are in full surface contact, thereby providing a strong bearing engagement and greatly reducing any tendency to wear.

It has heretofore been proposed, as illustrated in Figs. 7 and 8 hereof, to make the end bearing surfaces 18a symmetrically arcuate about equal radii R and R' both in the general plane of the link and in any radial plane perpendicular thereto through the center of transverse curvature. When viewed in sectional medial planes, as in Figs. 3 and 4 hereof, it might appear and naturally be assumed from superficial visual inspection that the bearing surfaces 18a so formed are susceptible of full surface contact when under chain tension, but I have found and it is also demonstrable from geometrical analysis that such is not the case, and that instead line contact only is obtained, such line contact occurring in the longitudinal medial planes. That merely line contact is obtained, and such only in the medial planes, will be evident from the fact that with a fixed generating axis A, the radius of curvature must vary, e. g., increase, in successive planes progressively away from the medial central plane parallel to the face of the link, as illustrated by the radius $R^2$, which is greater than the radius R. More particularly, in either face view (see Fig. 8), the outer line of curvature $l^2$, being concentric to the inner line of curvature $l^1$ of the transverse form, defines a larger arc than does the latter. This being the case, it is evident that there is not and cannot be surface contact between the ends of the link, and that the opposed surfaces recede from each other to define a space S of progressively increasing width therebetween at each side of either longitudinal medial plane.

Mere perpendicular cross line contact, as contrasted with full surface contact, is objectionable because it results in a weaker link construction, injurious strain and distortion of the links when placed under heavy longitudinal pull or tension, and excessive wear at the lines of contact.

According to the present invention, the inner bearing surfaces of the link ends are so formed that full surface contact is provided. Referring to Fig. 3, this form is obtained by generating each arcuate element of the component elements of the inner end bearing surfaces in planes parallel to the wide faces 15 and 16 of the link with one and the same predetermined radius R, and by locating the respective radial centers of these component elements on a locus in the perpendicular longitudinal medial plane describing the same arc or curvature as that of the elements. Thus, the medial element $E_1$ is struck on the radius R about the center $C_1$ in the medial plane $P_1$. One outermost element $E_2$ is struck on the same radius R about the center $C_2$ in the plane $P_2$ of the face 15. The other outermost element $E_3$ is similarly struck on the same radius R about the center $C_3$ in the plane $P_3$ of face 16. All intermediate elements are struck on the same radius R about respective centers in their corresponding parallel planes and falling on the curved locus $C_2$—$C_1$—$C_3$. It follows that all of the surface elements in longitudinal planes parallel to the side faces 15 and 16, including $E_1$, $E_2$ and $E_3$ and all intermediate elements, designated generically as elements $E_x$, have precisely the same degree of curvature, but are not concentric.

To obtain a centered pull, the concave elements $E_x$ in the longitudinal planes parallel to the faces 15 and 16 extend symmetrically through the longitudinal medial plane $P_4$ perpendicular to the faces 15 and 16 and equal distances to opposite sides thereof a chordal distance $a$—$b$ substantially equal to the thickness of the link, or slightly more. In the present instance, the elements $E_x$ subtend an angle about their respective radii of substantially 90°.

By reason of the foregoing construction, the transverse shape or form of the inner end surfaces is uniformly convexly arcuate on a radius of the same length as the radius R as the elements $E_x$. More particularly, the locus of the centers of the elements $E_x$ parallel to the faces 15 and 16 being arcuate on the uniform radius R, the medial transverse element $E_4$ in the longitudinal medial plane $P_4$, i. e., the central element perpendicular to the faces 15 and 16, is convexly arcuate also on the radius R. All transverse elements, including the element $E_4$ and others in planes parallel to and at opposite sides of the medial plane $P_4$, designated generally as elements $E_y$, are also convexly arcuate on the same radius R. Note that the elements $E_y$ have the same curvature as the element $E_4$. This will be evident from the fact that all of these transverse elements $E_y$ have the same projected length in the plane $P_2$ (see Fig. 3), as exemplified by the foreshortened distances $a$—$a$, $b$—$b$ and $c$—$c$, and corresponding distances of intermediate elements.

Since all of the surface elements $E_x$ and $E_y$, whether the concave elements in the normal planes or the convex elements in the longitudinal transverse planes, have the same degree of curvature in the direction of pull, the surfaces of the two interconnecting ends of any two adjacent links will inherently interfit with full surface contact. In other words, the bearing surface is so shaped that it is fully complemental to a counterpart of itself located at right angles and in opposed relation thereto. By reason of this arrangement, either line identified as $E_1$ in Fig. 6 represents the normal element of one link and the transverse element $E_4$ of the other link. The same coincident relationship exists as to the other normal and transverse elements of the contacting link surfaces, thus showing full surface contact. Likewise, each cross-hatched area representing the plane $P_1$ of one link represents also the plane $P_4$ of the other link.

From and beyond the opposite ends of the concavely arcuate elements $E_x$, the adjoining portions of the inner surfaces of the openings 13 and 14 are formed arcuately on radii of increased length about radial centers on fixed axes $A_1$ and $A_2$, located, respectively, at the remote sides of and offset with respect to the medial plane $P_4$. To effect tangential connections of the ends of the concave elements $E_x$ with the outer adjoining elements, the axes $A_1$ and $A_2$ are located in line with the center $C_1$ and the points $a$ and $b$.

I claim as my invention:

1. A chain link in the form of a loop having curved opposite link ends with inner bearing surfaces, the component elements of each surface in all longitudinal planes parallel to the general plane of the link being concavely arcuate, the component elements of each surface in all longitudinal planes perpendicular to the general plane over a chordal length of said first mentioned elements equal at least to the thickness of the link being convexly arcuate, all said concavely and convexly arcuate surface elements having substantially the same curvature on the same radial length, whereby the coacting bearing surfaces of two interconnected links are adapted for full surface contact.

2. A chain link in the form of a closed elongated loop having flat parallel faces, side bars, curved opposite link ends, and a transverse tie bar connecting said side bars, the inner surface of each of said ends in the general plane of said link being curved symmetrically along a central concave arc on a relatively short predetermined radius and extending through approximately 90°, and then being curved along contiguous arcs struck on radii longer than said first mentioned radius and each extending approximately through 45°, the inner surfaces of said side bars in the general plane of said link being oppositely and equally inclined to diverge uniformly from said contiguous arcs in a medial direction toward the center portion of said link, the inner surface of each of said ends being convexly curved transversely in longitudinal planes perpendicular to the general plane also on said first mentioned radius, whereby any two such links may be interconnected and adapted for full surface contact between the inner surfaces of the coacting link ends.

3. A chain link in the form of a closed, elongated loop having curved opposite link end portions with inwardly facing bearing surfaces, each of said end surfaces having component curved elements concave in planes parallel to the general plane of the link and of equal curvature to each other, said elements having a length at least as great as the thickness of the link, each of said end surfaces also having component curved elements convex in planes perpendicular to the general plane of the link and a curvature equal to each other and to the curvature of said first component elements, whereby said surfaces will interfit with full surface contact with a like surface disposed at right angles thereto.

4. A chain link in the form of a loop having curved opposite link ends with inner bearing surfaces, the component elements of each surface in all longitudinal planes parallel to the general plane of the link being concavely arcuate, said component elements having equal radii of curvature, each of said component elements having a center of curvature lying in the longitudinal parallel plane of the element and positioned at the intersection of the parallel longitudinal plane with an arcuate line of centers, said arcuate line of centers lying in a longitudinal medial plane perpendicular to the general plane of the link and also lying longitudinally outwardly of the bearing surface elements, said arcuate line of centers having the same radius of curvature as said component elements whereby the coacting bearing surfaces of two interconnected links are adapted for full surface contact.

CHARLES E. SENNHOLTZ.

References Cited in the file of this patent

UNITED STATES PATENTS

| Number | Name | Date |
|---|---|---|
| 2,103,972 | Harris | Dec. 28, 1937 |
| 2,525,193 | Anderson et al. | Oct. 10, 1950 |

FOREIGN PATENTS

| Number | Country | Date |
|---|---|---|
| 200,383 | Germany | July 14, 1908 |